(12) United States Patent
Hatazawa et al.

(10) Patent No.: US 6,368,744 B1
(45) Date of Patent: Apr. 9, 2002

(54) NONAQUEOUS ELECTROLYTE BATTERY HAVING A CASING CONSTITUTED BY A LAMINATE FILM

(75) Inventors: Tsuyonobu Hatazawa; Kazuhito Hatta; Tomitaro Hara, all of Miyagi; Takashi Ono; Kouji Watanabe, both of Fukushima, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/440,537

(22) Filed: Nov. 16, 1999

(30) Foreign Application Priority Data

Nov. 18, 1998 (JP) .............................. 10-328512

(51) Int. Cl.[7] .................................................. H01M 2/02
(52) U.S. Cl. ...................................................... 429/163
(58) Field of Search ................................ 429/7, 92, 93, 429/121, 231.95, 127, 163

(56) References Cited

U.S. PATENT DOCUMENTS

| 5,436,089 A | | 7/1995 | Fedele | |
| 5,895,731 A | * | 4/1999 | Clingempeel | 429/162 |
| 6,117,576 A | * | 9/2000 | Sugai | 429/7 |

FOREIGN PATENT DOCUMENTS

| EP | 0 390 557 A2 | 10/1990 |
| EP | 0 644 642 A2 | 3/1995 |
| EP | 0 862 230 A2 | 9/1998 |
| EP | 0 863 564 A1 | 9/1998 |
| EP | 0 917 218 A2 | 5/1999 |
| JP | 07 201358 A | 12/1995 |
| JP | 09 139235 A | 9/1997 |

* cited by examiner

*Primary Examiner*—Gabrielle Brouillette
*Assistant Examiner*—Monique Wills
(74) *Attorney, Agent, or Firm*—Bell, Boyd & Lloyd LLC (57) ABSTRACT

A nonaqueous electrolyte battery is disclosed which has an improved volume energy density and satisfactory impact resistance, a heat radiating characteristic and producibility. The battery element is accommodated in a casing constituted by a laminate film so as to be sealed by welding. Electrode-terminal leads electrically conducted to electrodes which constitute the battery element are sandwiched by welded portions so as to be exposed to the outside portion of the casing. A control circuit of the battery is mounted on a welded portion of the casing. Since the control circuit of the battery is mounted on the welded portion of the casing, the space in the battery in which the battery element is not present can effectively be used. Therefore, the volume efficiency can considerably be improved.

16 Claims, 4 Drawing Sheets

NONAQUEOUS ELECTROLYTE BATTERY HAVING A CASING CONSTITUTED BY A LAMINATE FILM

RELATED APPLICATION DATA

The present application claims priority to Japanese Application No. P10-328512 filed Nov. 18, 1998 which application is incorporated herein by reference to the extent permitted by law.

BACKGROUND OF THE INVENTION

1. Field of the Invention

The present invention relates to a nonaqueous electrolyte battery incorporating a casing constituted by a laminate film in which a battery element is accommodated. More particularly, the present invention relates to improvement in a volume energy density of a gel electrolyte battery, a solid electrolyte battery or the like.

2. Description of the Related Art

In recent years, a multiplicity of portable electronic apparatuses including camcorders, portable telephones and portable computers have come on the market. An attempt has been made to reduce the size and weight of the foregoing electronic apparatuses. As the portable power sources for the foregoing electronic apparatuses, batteries, in particular, secondary batteries, and more particularly, nonaqueous-electrolyte secondary batteries (so-called "lithium ion batteries") have energetically researched and developed to reduce the thickness of the battery and realize a foldable structure.

As the electrolyte for the shape-variable battery, solidified electrolytic solution has energetically been studied. In particular, attention is being given to a polymer solid electrolyte lithium salt is dissolved in a gel electrolyte, which is a solid electrolyte containing a plasticizer, or a polymer.

On the other hand, the merits of the foregoing battery, which are small thickness and light weight, are attempted to be used. Therefore, a variety of batteries have been studied which have an encapsulating structure which uses a plastic film or a laminate film constituted by bonding a plastic film and a metal sheet to each other.

For example, a secondary battery must have a control circuit which controls charge/discharge and which is disposed in the vicinity of the battery. Therefore, a structure is required with which the volume efficiency can be improved if the foregoing charge/discharge circuit is mounted.

Moreover, the battery having the above-mentioned structure must have a variety of characteristics as the battery investigated to cause the overall body of the battery including the control circuit to have impact resistance, improve the efficiency when the volume energy density is defined with the outer size of the battery constituted by the laminate film and improve heat radiating characteristic to elongate lifetime against charge/discharge cycles which is one of performance factors when the battery is operated.

SUMMARY OF THE INVENTION

In view of the foregoing, an object of the present invention is to provide a nonaqueous electrolyte battery exhibiting an excellent volume efficiency even if a control circuit is mounted thereon.

Another object of the present invention is to provide a nonaqueous electrolyte battery exhibiting excellent impact resistance and a heat radiating characteristic and having a long lifetime against charge/discharge cycles which is a performance factor when the battery is used.

Another object of the present invention is to provide a nonaqueous electrolyte battery exhibiting excellent producibility.

To achieve the foregoing objects, according to one aspect of the present invention, there is provided a nonaqueous electrolyte battery incorporating a casing constituted by a laminate film in which a battery element is accommodated and encapsulate by welding and electrode-terminal leads electrically conducted with electrodes are exposed to the outside portion of the casing such that the electrode-terminal leads are sandwiched by a welded portion, the nonaqueous electrolyte battery comprising: a control circuit for the nonaqueous electrolyte battery mounted on the welded portion of the casing.

The term "welded" as used throughout the text means the same as and is interchangeable with the term "heat sealing."

Since the control circuit of the battery is mounted on the welded portion, spaces in the battery in which the battery element is not present can effectively be used. As a result, the volume efficiency can considerably be improved.

The basic concept of the present invention is as described above. Moreover, the present invention is structured to raise the volume energy density of the outer size of the battery including the control circuit for the battery. Thus, excellent impact resistance is attempted to be realized. Therefore, a portion of the welded portion except for the portion in which the electrode-terminal leads are sandwiched by the laminate film and which is welded is folded one or more times toward the side ends of the battery to have a width smaller than the thickness (the shortest length of the battery is defined to be a "thickness of the battery") of the battery. Thus, the size in the direction of the thickness of the battery is minimized. Thus, the foregoing folded portion protects the overall body of the battery including the battery.

To improve the heat radiating characteristic, the portions folded toward the side ends of the battery are not bonded, that is, folded so as to enlarge the surface area.

To improve impact resistance, the portions are folded toward the side ends of the battery with a curvature.

Other objects, features and advantages of the invention will be evident from the following detailed description of the preferred embodiments described in conjunction with the attached drawings.

DESCRIPTION OF THE PREFERRED EMBODIMENTS

The structure of a nonaqueous electrolyte battery according to the present invention will now be described with reference to the drawings.

Figure 1:
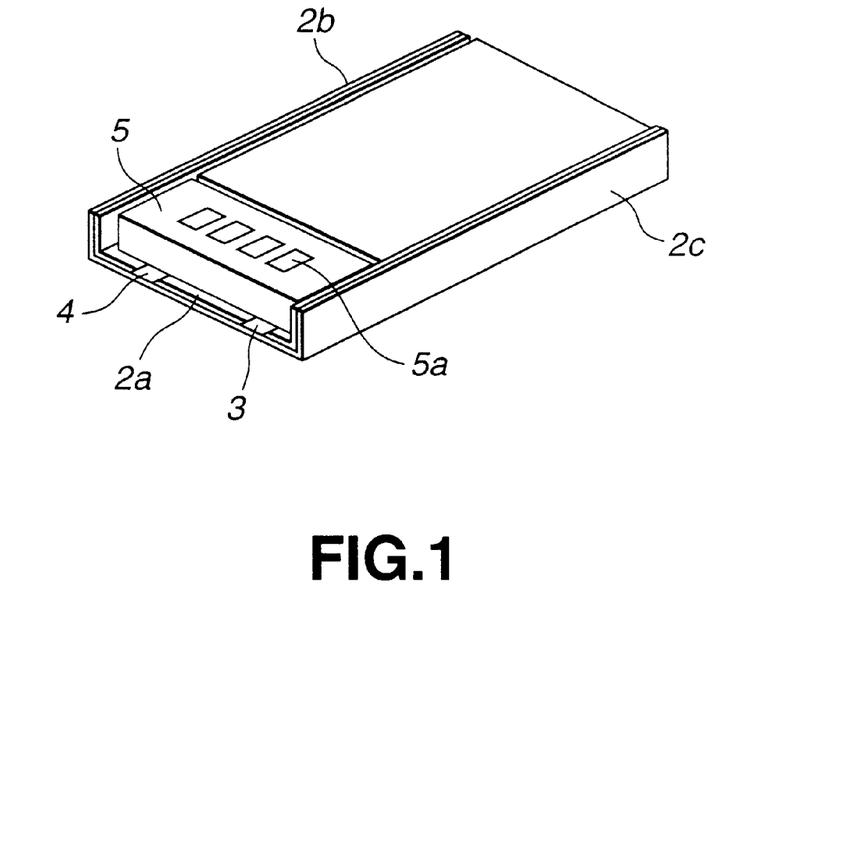
FIG. 1 is a schematic perspective view showing an example of the structure of a nonaqueous electrolyte battery according to the present invention.
Figure 2:
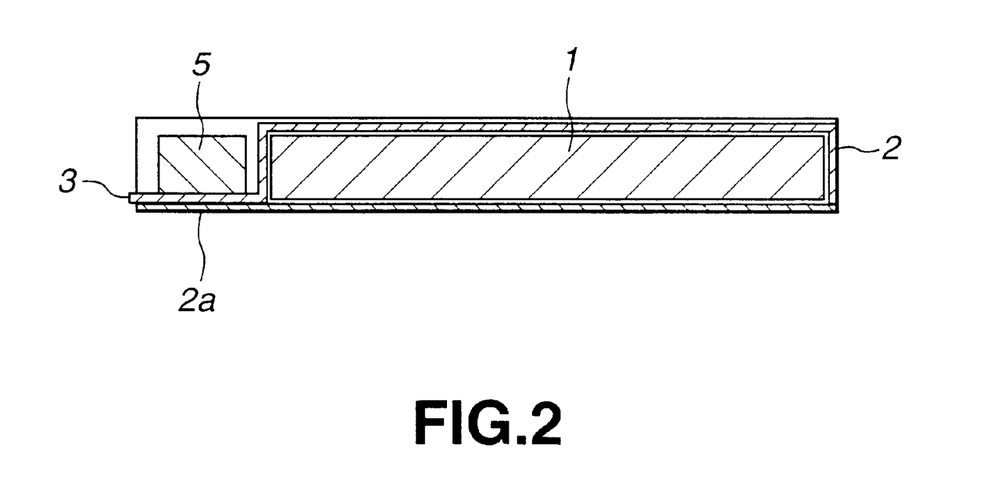
FIG. 2 is a schematic cross sectional view showing an example of the structure of the nonaqueous electrolyte battery according to the present invention.

The nonaqueous electrolyte battery (a so-called "lithium-ion secondary battery") according to the present invention is, for example, a solid electrolyte battery or a gel electrolyte battery. As shown in FIGS. 1 and 2, a battery element 1 having a structure that a solid electrolyte or a gel electrolyte is placed between a positive-electrode active-material layer and a negative-electrode active-material layer is accommodated in a casing 2 constituted by a laminate film. The peripheral portion of the casing 2 is welded so that the battery element 1 is encapsulated. The nonaqueous electrolyte battery according to the present invention has a substantially rectangular shape.

The battery element 1 is provided with a negative-electrode terminal lead 3 which is electrically connected to a negative electrode which constitutes the battery element 1 and a positive-electrode terminal lead 4 which is electrically connected to a positive electrode. The negative-electrode terminal lead 3 and the positive-electrode terminal lead 4 are drawn to the outside portion of the casing 2.

The negative-electrode terminal lead 3 and the positive-electrode terminal lead 4 are joined to collectors of the positive and negative electrodes. The positive-electrode terminal lead 4 must be made of a material, for example, aluminum, titanium or their alloy, which is not melted at a high potential. The negative-electrode terminal lead 3 may be made of copper, nickel or their alloy.

The lithium-ion secondary battery is formed into a battery which is a final produced when the body and the control circuit are packed in a decorative case.

At this time, there is a requirement for effectively using a limited space to introduce many battery elements to raise the volume efficiency so as to improve the performance.

The volume efficiency of a battery of a type having a structure that a flat battery is packed in a laminate film is greatly determined by a method of constituting the sealing portion. If the capacity of the battery is the same, reduction in the thickness is an important factor. In a case of a battery having a thickness of 3 mm, enlargement of a thickness of 100 $\mu$m results in deterioration in the volume efficiency by 3%. Enlargement of the thickness by 100 $\mu$m of a battery having a thickness of 0.5 mm results in deterioration in the volume efficiency by 20%.

The direction in which the terminal leads are drawn will now be considered. A structure has been disclosed in, for example, Japanese Patent Laid-Open No. 10-208710, formed such that the terminal leads are drawn from a portion which is not the welded portion of the laminate film by using the surface of the collector of the battery element. When the connection with the control circuit is considered, the electric line connected to the control circuit is present in the direction of the thickness of the battery. Therefore, the volume efficiency of the battery undesirably deteriorates after the body of the battery and the control circuit are packed in the decorative case and thus a final product is manufactured.

Therefore, the welded portion 2a of the laminate film holds the negative-electrode terminal lead 3 and the positive-electrode terminal lead 4, as shown in FIGS. 1 and 2. Thus, the negative-electrode terminal lead 3 and the positive-electrode terminal lead 4 are drawn from the welded portion 2a.

The control circuit 5 is mounted on a space in which the battery element 1 is not present. Thus, the battery element 1 and the control circuit 5 are electrically connected to each other. Moreover, the control circuit 5 is held on the welded portion 2a of the casing 2 so as to be stable against vibrations and a shock.

When a space capable of accommodating the battery element 1 is previously provided for the casing 2 by, for example, deep drawing, the space on which the control circuit 5 is mounted can effectively be created. As a result, the space can furthermore effectively be used.

The welded portion of the casing 2 in a direction except for the direction from which the terminal leads are drawn will now be described. Welded portions 2b and 2c corresponding to two sides perpendicular to the welded portion 2a from which the terminal leads are drawn are folded one or more times in such a manner that the width is not larger than the thickness of the battery. The welded portions 2b and 2c are folded back toward the side ends of the battery. Thus, the size of the battery in the direction of the thickness is shortened. The folded portions, that is, the welded portions 2b and 2c protect the battery including the control circuit 5.

The welded portions 2b and 2c are folded toward the sides ends of the battery to shorten the length in the direction of the thickness of the battery. Thus, the volume efficiency can considerably be improved. In a case of a battery element having a thickness of 3.3 mm, the volume efficiency become different by about 5%. In a case of a battery element having a thickness of 0.5 mm, the volume efficiency becomes different by about 25%.

The folded welded portions 2b and 2c protect the control circuit 5 from the side surfaces from an external impact. The foregoing structure permits a battery exhibiting a high volume energy density of the overall size of the battery including the control circuit and satisfactory impact resistance to be obtained.

The basic structure of the nonaqueous electrolyte battery according to the present invention is formed as described above. To specifically describe the structure of the nonaqueous electrolyte battery according to the present invention, a procedure for mounting the control circuit 5 is shown in FIGS. 3 and 4.

Figure 3:
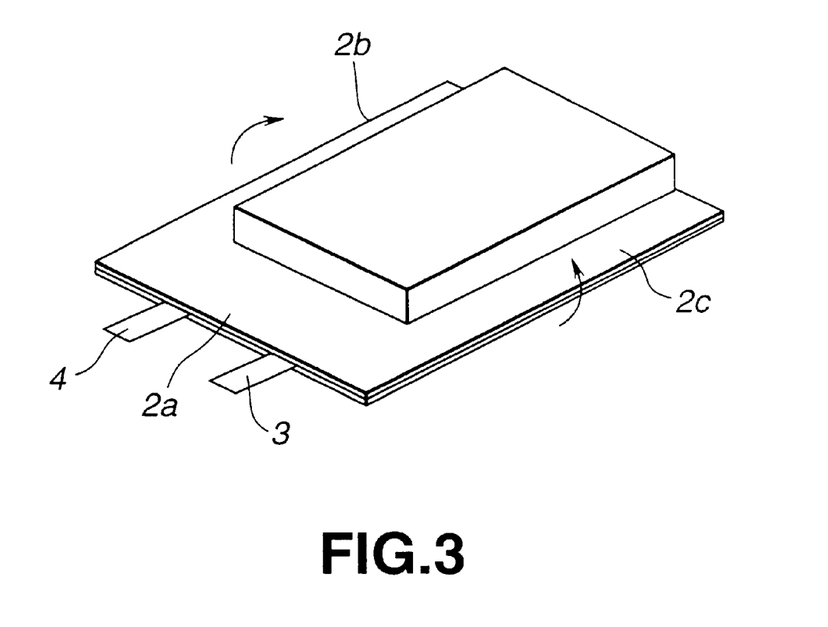
FIG. 3 is a schematic perspective view showing a process for folding a welded portion.
Figure 4:
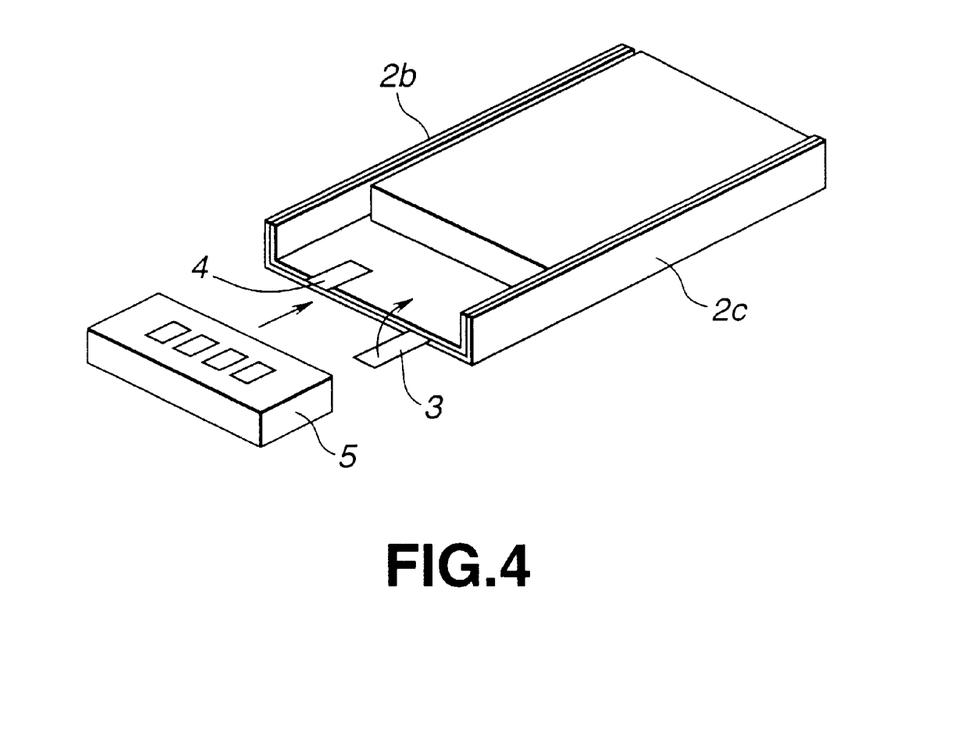
FIG. 4 is a schematic perspective view showing a process for folding electrode-terminal leads back.

To mount the control circuit 5, the welded portions 2b and 2c are folded toward the side ends of the battery, as shown in FIG. 3. Then, as shown in FIG. 4, the negative-electrode terminal lead 3 and the positive-electrode terminal lead 4 are folded back onto the welded portion 2a. Then, the control circuit 5 is secured to the upper surfaces of the negative-electrode terminal lead 3 and positive-electrode terminal lead 4. Thus, the control circuit 5 and the positive and negative terminal leads 3 and 4 are electrically connected to one another. Therefore, the above-mentioned battery structure can be obtained.

The battery having the above-mentioned structure is accommodated in a case, for example, a decorative case so that a final product is formed. When a connection terminal 5a of the control circuit 5 is exposed to the outside through an opening provided for the container, the connection to an external circuit is permitted.

It is preferable that the welded portions 2b and 2c are not bonded by an adhesive agent or the like. As an alternative to this, it is preferable that, for example, plastic deformation of metal foil constituting the casing 2 is used to maintain the state of folding. As a result, a battery having a large surface area, exhibiting excellent a heat radiating characteristic and satisfactory cycle characteristic can be obtained.

Figure 5:
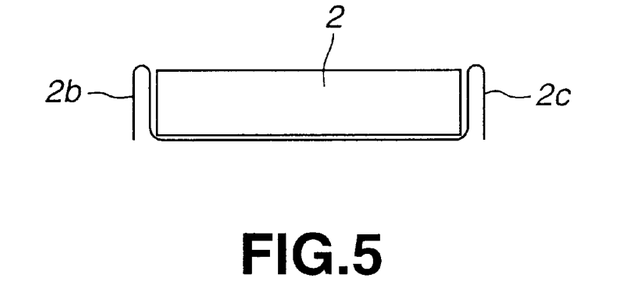
FIG. 5 is a schematic perspective view showing an example of a state in which the welded portion is folded.
Figure 6:
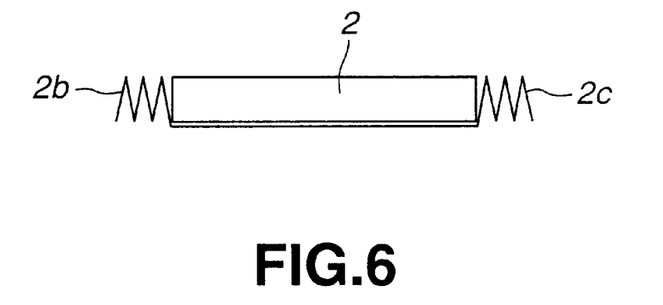
FIG. 6 is a schematic perspective view showing another example of a state in which the welded portion is folded.

When the width of each of the welded portions 2b and 2c is larger than the thickness of the battery, the welded portions 2b and 2c may be folded back, followed by folding the same, as shown in FIG. 5. When the thickness of the battery is very small, the welded portions 2b and 2c may be folded back plural times to form a bellows form, as shown in FIG. 6.

It is preferable that the welded portions 2b and 2c are folded with a certain curvature. As compared with a structure that the welded portions 2b and 2c are folded with substantially no curvature, the sealing characteristic can be maintained if damage of the casing 2 constituted by the laminate film occurs in a case where the battery is dropped.

If the curvature radius is 0.025 mm or smaller, the effect of providing the curvature cannot easily be obtained. If the curvature radius is 1 mm or larger, a volume efficiency loss occurs excessively. It is preferable that the curvature radius is 0.05 mm to 0.5 mm. If the curvature radius is 0.05 mm or larger, the welded portions 2b and 2c can be folded by a machine. Therefore, a variety of methods can be used which include a method that a wire is sandwiched when folding is performed. When the welded portions 2b and 2c are folded with the curvature radius of 0.5 mm or larger, impact exerted from a planar direction cannot effectively be absorbed.

Figure 7:
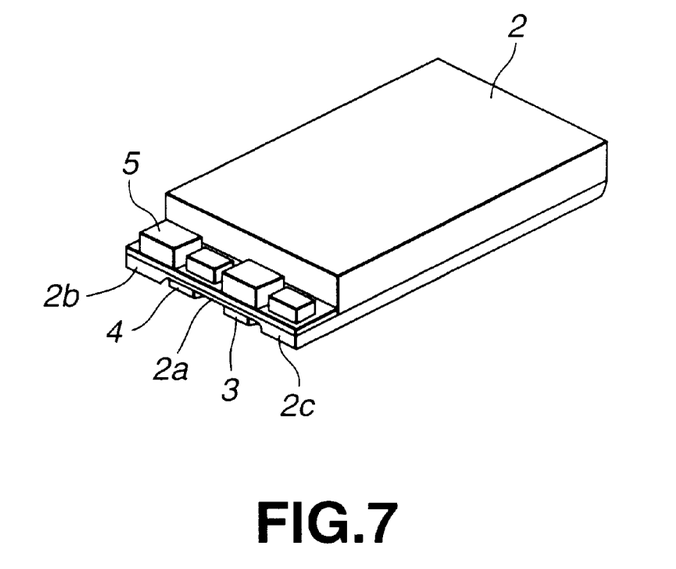
FIG. 7 is a schematic perspective view showing another example of the nonaqueous electrolyte battery according to the present invention.
Figure 8:
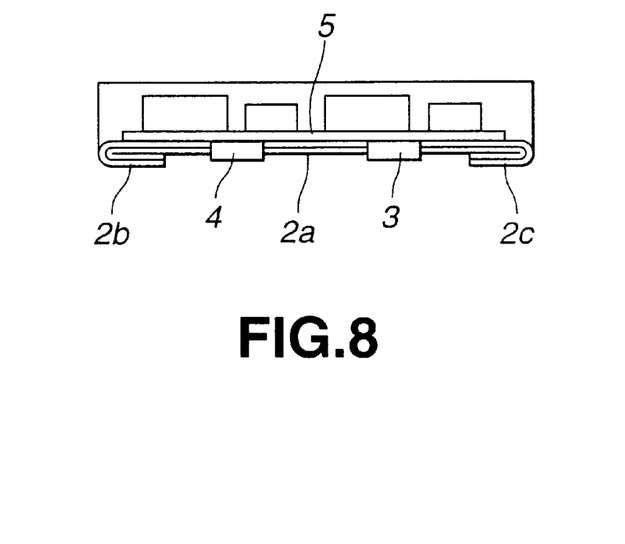
FIG. 8 is a schematic front view showing another example of the nonaqueous electrolyte battery according to the present invention.

The welded portions 2b and 2c can be folded toward the bottom, as shown in FIGS. 7 and 8. Also the foregoing structure is included in the scope of the present invention. In the foregoing case, the volume efficiency somewhat deteriorates as described above.

In the foregoing case, the size of the substrate for the control circuit 5 must be minimized to enable the control circuit 5 to be included in the terminal-portion sealing area. Therefore, it is preferable that a double-sided substrate is employed for the control circuit 5 and a land is formed on the reverse side of the substrate to establish the connection with the battery.

Figure 9:
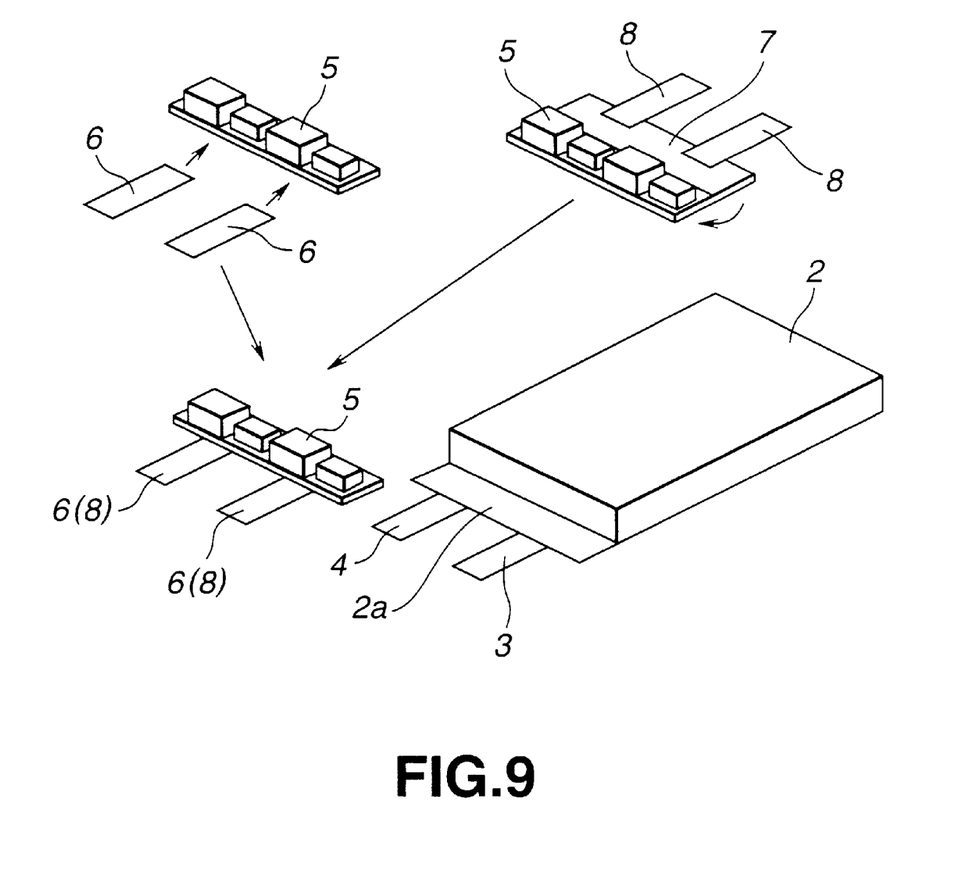
FIG. 9 is an exploded perspective view showing an example of formed terminals in a control circuit.

Although the terminals of the battery may directly be soldered to the substrate of the control circuit 5, damage occurs if the welded portion 2a, which is the sealing portion of the battery, is heated. Therefore, the terminals are previously connected to the substrate of the control circuit 5. Moreover, the terminals are connected to each other by a means, such as resistance welding or ultrasonic welding, which does not exert excessive influence of heat. In the foregoing case, the foregoing damage can be prevented. Therefore, the terminals of the control circuit 5 may be structured such that individual terminal plates 6 are bonded to the control circuit 5 so as to be superimposed on the negative-electrode terminal lead 3 and the positive-electrode terminal lead 4. As an alternative to this, the control circuit 5 may be formed on a printed circuit board 7 having terminals 8 formed thereon. Moreover, the printed circuit board 7 is folded back to superimpose the terminals 8 on the negative-electrode terminal lead 3 and the positive-electrode terminal lead 4.

Since the foregoing terminals result in enlargement of the size of the battery if not contrivance is employed, it is preferable that the terminals are folded. When the terminals are folded back to the bottom surface, the stepped portions of the welded portions 2b and 2c can be used. Therefore, the overall thickness of the battery can be reduced.

When a solid electrolyte battery or a gel electrolyte battery is manufactured which incorporates the battery element 1, a polymer material for constituting the solid polymer electrolyte may be any one of the following materials: silicon gel, acrylic gel, acrylonitrile gel, polyphosphagen denatured polymer, polyethylene oxide, polypropylene oxide, their composite polymer, their crosslinked polymer or fluorine polymer which is, for example, poly (vinylidene fluoride), poly (vinylidene fluoride-co-hexafluoropropylene), poly (vinylidene fluoride-co-tetrafluoroethylene), poly (vinylidene fluoride-co-trifluoroethylene) and their mixture. As a matter of course, the material is not limited to the foregoing materials.

The solid electrolyte or the gel electrolyte laminated in the active material layer of the positive electrode or the active material layer of the negative electrode is obtained by causing the active material layer of the positive electrode or the active material layer of the negative electrode to be impregnated with solution composed of a polymer compound, an electrolyte salt and solvent (and a plasticizer in the case of the gel electrolyte). Then, the solvent is removed so that the solution is solidified. The active material layer of the positive electrode or the active material layer of the negative electrode is impregnated with a portion of the solid electrolyte or the gel electrolyte laminated in the active material layer of the positive electrode or the active material layer of the negative electrode so as to be solidified. In the case of the crosslinked material, light or heat is used to crosslink the material so as to be solidified.

The gel electrolyte is composed of a plasticizer containing a lithium salt and 2 wt% to 30 wt% matrix polymer. At this time, ester, ether or carbonate may be employed solely or a component of the plasticizer.

When the gel electrolyte is prepared, a matrix polymer for gelling the carbonate may be any one of a variety of polymers for use to constitute the gel electrolyte. From a viewpoint of stability of oxidation and reduction, it is preferable that a fluorine polymer, such as poly (vinylidene fluoride) or poly (vinylidene fluoride-co-hexafluoropropylene), is employed.

The solid polymer electrolyte is composed of a lithium salt and a polymer compound for dissolving the lithium salt. The polymer compound may be ether polymer, such as poly (ethylene oxide) or its crosslinked material, poly (methacrylate) ester, acrylate material, fluorine polymer, such as poly (vinylidene fluoride) or poly (vinylidene fluoride-co-hexafluoropropylene) may solely be employed or their mixture may be employed. From a viewpoint of stability of oxidation and reduction, it is preferable that a fluorine polymer, such as poly (vinylidene fluoride) or poly (vinylidene fluoride-co-hexafluoropropylene), is employed.

The lithium salt which is contained in the gel electrolyte or the solid polymer electrolyte may be the lithium salt for use in a usual electrolytic solution for a battery. The lithium compound (salt) may be the following materials. Note that the present invention is not limited to the following materials.

The lithium compound (salt) is exemplified by lithium chloride, lithium bromide, lithium iodide, lithium chlorate, lithium perchlorate, lithium bromate, lithium iodate, lithium nitrate, lithium tetrafluoroborate, lithium hexafluorophosphate, lithium acetate, bis (trifluoromethanesulfonyl) imide lithium, $LiAsF_6$, $LiCF_3SO_3$, $LiC(SO_2CF_3)_3$, $LiAlCl_4$ and $LiSiF_6$.

The foregoing lithium compound may solely be employed or a plurality of the lithium compounds may be mixed. From a viewpoint of stability of oxidation, it is preferable that $LiPF_6$ or $LiBF_4$ is employed.

The concentration of the lithium salt which must be dissolved will now be described. In the case of the gel electrolyte, 0.1 mol to 3.0 mol may be dissolved in the plasticizer. It is preferable that the concentration is 0.5 mol/litter to 2.0 mol/litter.

The battery according to the present invention may have a structure of a conventional lithium-ion battery except for the structure that the gel electrolyte or the solid electrolyte is employed.

That is, the material of the negative electrode of a lithium-ion battery may be a material which permits doping/dedoping of lithium. The material for constituting the negative electrode, for example, non-graphitizing carbon or graphite may be employed. Specifically, any one of the following materials may be employed: pyrocarbon, cokes (pitch cokes, needle cokes or petroleum cokes), graphite, vitreous carbon, a sintered material of organic polymer compound (material obtained by baking phenol resin or furan resin at a proper temperature so as to be carbonized), carbon fiber and active carbon. As the material which permits doping/dedoping lithium, polymer, such as polyacetylene or polypyrrole, or an oxide, such as $SnO_2$, may be employed. When the negative electrode is constituted from the foregoing material, a known binder or the like may be added.

The positive electrode may be constituted by using metal oxide, metal sulphide or specific polymer as the active material of the positive electrode. When a lithium battery is constituted, the active material of the positive electrode may be metal sulphide or oxide, such as $TiS_2$, $MoS_2$, $NbSe_2$ or $V_2O_5$, which does not contain lithium, or lithium composite oxide mainly composed of $LiMo_2$ (where M is one or more types of transition metal, x varies depending on a state of charge/discharge and it is 0.05 or more and 1.10 or less). As the transition metal M which constitutes the lithium composite oxide, it is preferable that Co, Ni or Mn is employed. The lithium composite oxide is exemplified by $LiCoO_2$, $LiNiO_2$, $LiNi_yCo_{1-y}O_2$ (where 0<y<1) and $LiMn_2O_4$. The foregoing lithium composite oxide is an excellent active material of the positive electrode which is capable of generating high voltage and which exhibits a satisfactory energy density. The positive electrode may be constituted by combining a plurality of types of the foregoing active materials of the positive electrode. When the positive electrode is constituted by using the foregoing active material of the positive electrode, a known conductive material and a binder may be added.

The structure of the battery element 1 may be a laminate structure formed such that the positive electrodes and negative electrodes are alternately laminated in such a manner that the solid electrolyte is sandwiched, a winding-type structure formed such that the positive electrode and the negative electrode are laminated in such a manner that the solid electrolyte is sandwiched and the thus-formed laminate is wound and a folded structure formed such that the positive electrode and the negative electrode are laminated in such a manner that the solid electrolyte is sandwiched and the thus-formed laminate is alternately folded. The structure may arbitrarily be selected.

The present invention may be applied to either of a primary battery or the secondary battery. When the present invention is applied to a nonaqueous-electrolyte secondary battery, a satisfactory effect can be obtained.

EXAMPLES

Examples and comparative examples of the present invention will now be described in accordance with results of experiments.

Sample batteries were manufactured and evaluated by the following methods.

Manufacturing of Sample Batteries

Initially, the negative electrode was manufactured as follows.

Powder of pulverized graphite in a quantity of 90 parts by weight and 10 parts by weight of poly (vinylidene fluoride-co-hexafluoropropylene) were mixed so that a mix for the negative electrode was prepared. Then, the foregoing mix was dispersed in N-methyl-2-pyrolidone so that slurry was prepared. The foregoing slurry was uniformly applied to either surface of an elongated copper foil which was a collector for the negative electrode and having a thickness of 10 $\mu$m. Then, the wet surface was dried, followed by compression-molding the elongated copper foil by a roll pressing machine. Thus, a negative electrode was manufactured.

On the other hand, the positive electrode was manufactured as follows.

To obtain an active material ($LiCoO_2$) for the positive electrode, lithium carbonate and cobalt carbonate were mixed at a ratio of 0.5 mol:1 mol, and then the mixed materials were baked at 900° C. for 5 hours in air. Then, 91 parts by weight of obtained $LiCoO_2$, 6 parts by weight of graphite serving as a conductive material and 10 parts by weight of poly (vinylidene fluoride-co-hexafluoropropylene) serving as the binder were mixed with one another. Thus, a mix for the positive electrode was prepared. Then, the mix was dispersed in N-methyl-2-pyrolidone so that slurry was prepared. The foregoing slurry was uniformly applied to either surface of an elongated aluminum foil which was a collector for the positive electrode and having a thickness of 20 $\mu$m. Then, the wet surface was dried, followed by compression-molding the elongated aluminum foil by a roll pressing machine. Thus, a positive electrode was manufactured.

Moreover, the gel electrolyte was obtained as follows.

The surface of each of the negative and positive electrodes was uniformly coated with solution prepared by mixing and dissolving 10 parts by weight of poly (vinylidene fluoride-co-hexafluoropropylene) having a weight average molecular weight of 600,000 and 60 parts by weight of diethyl carbonate in 30 parts by weight of plasticizer composed of 42.5 parts by weight of ethylene carbonate (EC), 42.5 parts by weight of propylene carbonate (PC) and 15 parts by weight of $LiPF_6$. Thus, the negative electrode and the positive electrode were impregnated with the solution, and then negative electrode and the positive electrode were allowed to stand at room temperature for 8 hours. Thus, dimethyl carbonate was vaporized and removed so that the gel electrolyte was obtained.

The gel electrolyte sides of the negative electrode and the positive electrode were joined and contact-bonded. Thus, 3.3 cm×5.2 cm flat gel-electrolyte battery having a thickness of 0.3 mm and a capacity of 50 mAh and 3.3 cm×5.2 cm flat gel-electrolyte battery having a thickness of 3.3 mm and a capacity of 550 mAh were manufactured.

A positive-electrode-terminal lead made of aluminum and a negative-electrode-terminal lead made of nickel were welded to the surface of the portion of the pole plate on which the active material was not applied. Then, the manufactured structure was encapsulated in a pack constitute by a laminate film. The pack was welded at 200° C. for 10 seconds by a sealing machine so that test batteries were manufactured.

The structure of each sample was as follows.

Sample 1: the welded portions 2b and 2c were, in the wavy form, folded toward the side ends of the battery. As a result, the length in the direction of 3.3 cm was 3.4 cm. The thickness was 3.5 mm.

Sample 2: the welded portions 2b and 2c were inwards wound so as to be folded to the side ends of the battery. As a result, the length in the direction of 3.3 cm was 3.4 cm. The thickness was 3.5 mm.

Sample 3: the welded portions 2b and 2c were wound and folded. As a result, the length in the direction of 3.3 cm was 3.82 cm. The thickness was 0.5 mm.

Sample 4: the welded portions 2b and 2c were, in the form of bellows, folded. As a result, the length in the direction of 3.3 cm was 3.72 cm. The thickness was 0.5 mm.

Sample 5: the structure of the battery was similar to that of Sample 1. When the welded portions 2b and 2c were folded without any curvature.

Sample 6: the structure of the battery was similar to that of Sample 1. The folded welded portions 2b and 2c were bonded to each other.

Sample 7: the welded portions 2b and 2c were folded toward the bottom. As a result, the length in the direction of 3.3 cm was 3.32 cm. The thickness was 0.7 mm.

Sample 8: the welded portions 2b and 2c were folded toward the bottom. As a result, the length in the direction of 3.3 cm was 3.32 cm. The thickness was 3.7 mm.

Sample 9: the casing was not deep-drawn. The other structures were similar to Sample 1. The length in the direction of 3.3 cm was 3.4 cm. The thickness was 35 mm. When the control circuit was included, the corresponding portion projected. Thus, the thickness was 5 mm.

Sample 10: the control circuit was not mounted on the welded portion 2a. As an alternative to this, the control was joined to outwards project over the terminal lead.

The size of the control circuit of each sample was 32 mm×5 mm×3 mm.

The structural characteristics of the samples were shown in Table 1.

TABLE 1

| | Whether or not Control Circuit was Mounted | | Whether or not Deep Drawing was Performed | | Direction in which Welded Portion was Folded | |
|---|---|---|---|---|---|---|
| | mounted | not mounted | performed | not performed | Side Ends | Bottoms |
| Sample 1 | ○ | | ○ | | ○ | |
| Sample 2 | ○ | | ○ | | ○ | |
| Sample 3 | ○ | | ○ | | ○ | |
| Sample 4 | ○ | | ○ | | ○ | |
| Sample 5 | ○ | | ○ | | ○ | |
| Sample 6 | ○ | | ○ | | ○ | |
| Sample 7 | ○ | | ○ | | | ○ |
| Sample 8 | ○ | | ○ | | | ○ |
| Sample 9 | ○ | | | ○ | ○ | |
| Sample 10 | | ○ | ○ | | ○ | |

TABLE 1-continued

| | Whether or not Welded Portion was Bonded | | Whether or not Curvature was Provided when Welded Portion was Folded | |
|---|---|---|---|---|
| | bonded | not bonded | provided | not provided |
| Sample 1 | ○ | | ○ (0.1 r) | |
| Sample 2 | ○ | | ○ (0.1 r) | |
| Sample 3 | ○ | | ○ (0.1 r) | |
| Sample 4 | ○ | | ○ (0.1 r) | |
| Sample 5 | ○ | | | ○ |
| Sample 6 | | ○ | ○ (0.1 r) | |
| Sample 7 | ○ | | ○ (0.1 r) | |
| Sample 8 | ○ | | ○ (0.1 r) | |
| Sample 9 | ○ | | ○ (0.1 r) | |
| Sample 10 | ○ | | ○ (0.1 r) | |

Evaluation

The samples were evaluated as follows.

1. Each sample was initially discharged at a 5-hour ratio (1/5C) of the theoretical capacity. Then, the battery was charged at a 2-hour ratio (1/2C) of the theoretical capacity. The capacity realized after the discharge and an average discharging voltage were used to calculate the volume energy density in accordance with the volume of a rectangular parallelopiped of the structure which was packed in the laminate film and on which the control was mounted.

2. Each sample was subjected to a charge/discharge cycle test 500 times at the two-hour discharge (1/2C) of the theoretical capacity at 50° C. Thus, a retention ratio of the discharge capacity was measured.

3. Each sample was subjected to a 2 m in height drop test 50 times. Then, the sample was placed in a constant-temperature and humidity tank, the temperature of which was 70° C. and the relative humidity of which was 90%. After a lapse of 720 hours, measurement of water was performed by a Karl Fischer's method.

Results were shown in Table 2.

TABLE 2

| | Volume Energy Density (Wh/l) | Discharge Capacity Retention Ratio (%) | Concentration of Water (ppm) |
|---|---|---|---|
| Sample 1 | 280 | 92 | 3 |
| Sample 2 | 280 | 90 | 3 |
| Sample 3 | 159 | 93 | 2 |
| Sample 4 | 163 | 90 | 5 |
| Sample 5 | 280 | 90 | 12 |
| Sample 6 | 280 | 80 | 5 |
| Sample 7 | 130 | 90 | 3 |
| Sample 8 | 271 | 89 | 2 |
| Sample 9 | 208 | 91 | 3 |
| Sample 10 | 263 | 92 | 2 |

As can be understood from Table 2, Sample 1 to 4 each having the welded portions folded toward the side ends of the battery with the curvature had excellent volume energy densities. Also satisfactory impact resistance was realized. In addition, introduction of water was satisfactorily prevented. As a result, excellent cycle characteristics of the foregoing samples were confirmed.

On the other hand, Sample 5 having the welded portions folded without any curvature was unsatisfactory in the impact resistance. Damage of the corner portions constituted by the laminate film resulted in introduction of water. Thus, significant difference was confirmed.

Sample 6 having the bonded welded portions encountered an influence of the beat radiation characteristic which was exerted on the cycle characteristic When Samples 1 and 2 and the sample 7 were compared and when Samples 3 and 4 and Sample 6 were compared, an effect on the volume energy density was confirmed in a case where the welded portions except for the portion in which the electrode terminal leads were sandwiched by the laminate film so as to be welded were folded toward the side ends of the battery in such a manner that the width was smaller than the thickness of the battery.

When a comparison was made between Sample 1 and 2 and samples 9 and 10, an effect was confirmed in a case where the laminate film was employed in which the space was formed accommodate the battery and the control circuit was mounted on the space created in the terminal portion.

As can be understood from the description, according to the present invention, the nonaqueous electrolyte battery can be provided which exhibits a satisfactory volume energy density, the overall body of which including the control circuit has impact resistance, which has an improved heat radiating characteristic and elongated lifetime against charge/discharge cycles and which exhibits excellent producibility.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A nonaqueous electrolyte battery incorporating a casing constituted by a laminate film in which a battery element is accommodated and encapsulated by heat sealing and electrode-terminal leads electrically conducted with electrodes are exposed to the outside portion of said casing such that said electrode-terminal leads are sandwiched by a heat sealing portion; said nonaqueous electrolyte battery having a thickness and an outer shape comprising:

a control circuit for said nonaqueous electrolyte battery mounted on said heat sealing portion of said casing corresponding to one of four sides from which said electrode terminal leads are drawn, wherein the heat sealing portion corresponding to the other sides is folded to have a width smaller than the thickness of said battery so as to be folded back along a side surface of said casing, and wherein the outer shape of the battery is rectangular.

2. A nonaqueous electrolyte battery according to claim 1, wherein said casing is deep-drawn to create a space for accommodating said battery element.

3. A nonaqueous electrolyte battery according to claim 1, wherein two of said other sides are perpendicular to the side from which said electrode-terminal leads are drawn.

4. A nonaqueous electrolyte battery according to claim 3, wherein two end portions of said heat sealing portion on which said control circuit is mounted by folding is raised to create a space for accommodating said control circuit.

5. A nonaqueous electrolyte battery according to claim 1, wherein said heat sealing portion corresponding to the other sides maintains the folded state by plastic deformation of said casing.

6. A nonaqueous electrolyte battery according to claim 1, wherein said heat sealing portion corresponding to the other sides is folded with a curvature.

7. A nonaqueous electrolyte battery according to claim 6, wherein the curvature of said heat sealing portion corresponding to the other side is 0.05 mm to 0.5 mm.

8. A nonaqueous electrolyte battery according to claim 6, wherein said heat sealing portion corresponding to the other side is folded through a wire.

9. A nonaqueous electrolyte battery according to claim 1, wherein said electrode-terminal lead is folded back toward said heat sealing portion so as to be connected to said control circuit.

10. A nonaqueous electrolyte battery according to claim 1, wherein said control circuit is formed on a flexible printed circuit board, and a terminal portion provided for said flexible printer board is connected to said electrode-terminal lead.

11. A nonaqueous electrolyte battery according to claim 1, wherein an electrolyte constituting said battery element is a gel electrolyte or a solid electrolyte containing matrix polymer and a lithium salt.

12. A nonaqueous electrolyte battery according to claim 1, wherein a negative electrode constituting said battery element is a negative electrode containing a material which is capable of doping/dedoping lithium.

13. A nonaqueous electrolyte battery according to claim 11, wherein said material which is capable of doping/dedoping lithium is a carbon material.

14. A nonaqueous electrolyte battery according to claim 1, a positive electrode constituting said battery element is a positive electrode containing a composite oxide of lithium and transition metal.

15. A nonaqueous electrolyte battery according to claim 1, said nonaqueous electrolyte battery is a secondary battery.

16. A nonaqueous electrolyte battery according to claim 1, wherein said battery element is accommodated in a container together with said control circuit, and a terminal of said control circuit is exposed to the outside through an opening formed in said container.

* * * * *